April 28, 1925.
J. C. FOSTER
1,535,820
SHUTTER TIMING MECHANISM FOR MOTION PICTURE MACHINES
Filed Jan. 24, 1924
2 Sheets-Sheet 1
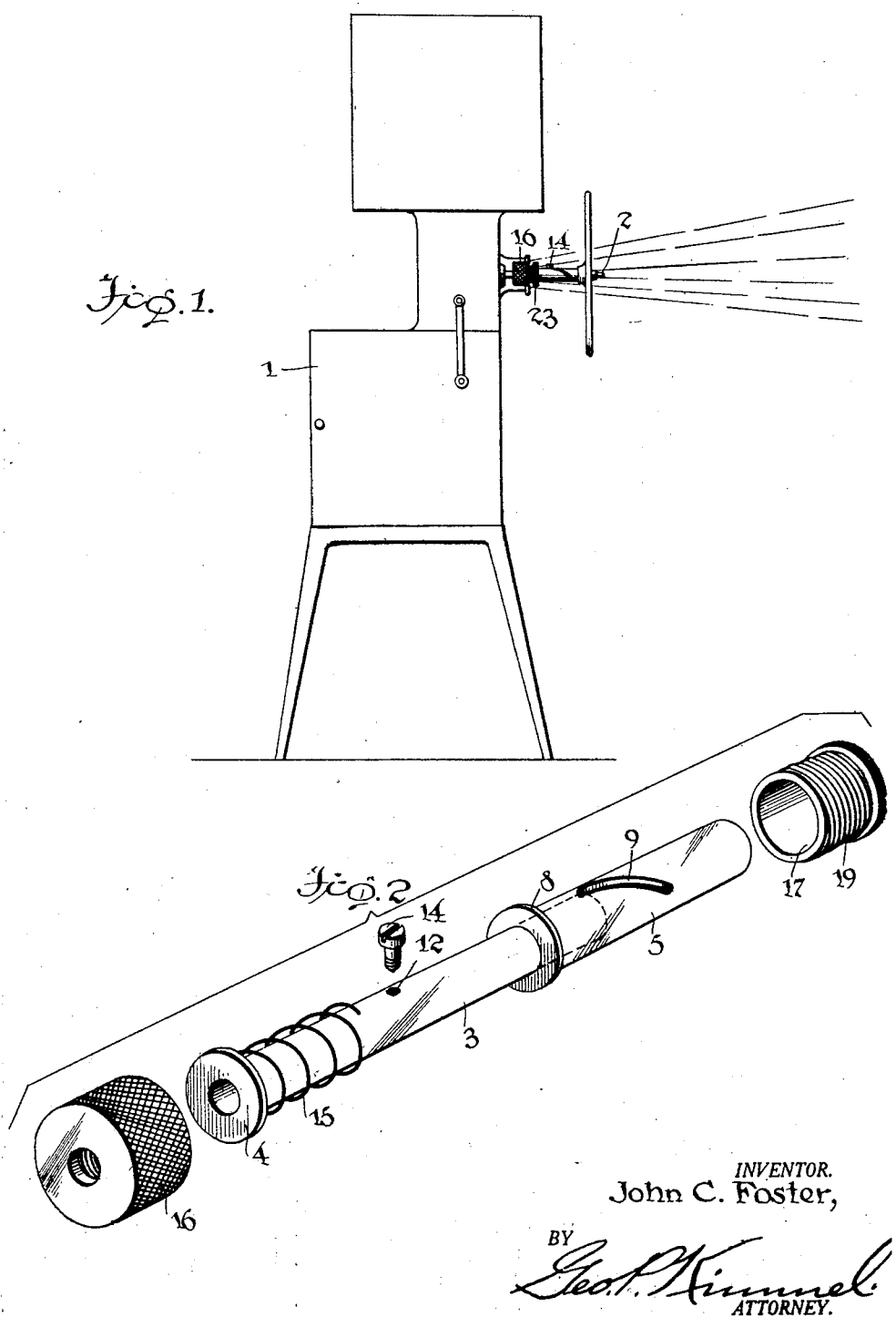
INVENTOR.
John C. Foster,
BY
Geo. F. Kimmel
ATTORNEY.

April 28, 1925.
J. C. FOSTER
SHUTTER TIMING MECHANISM FOR MOTION PICTURE MACHINES
Filed Jan. 24, 1924   2 Sheets-Sheet 2
1,535,820
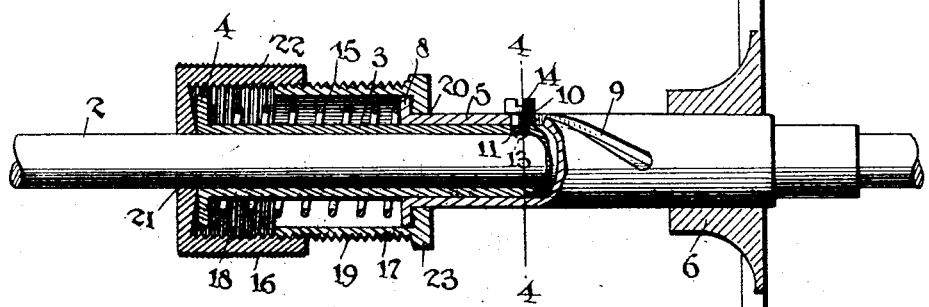
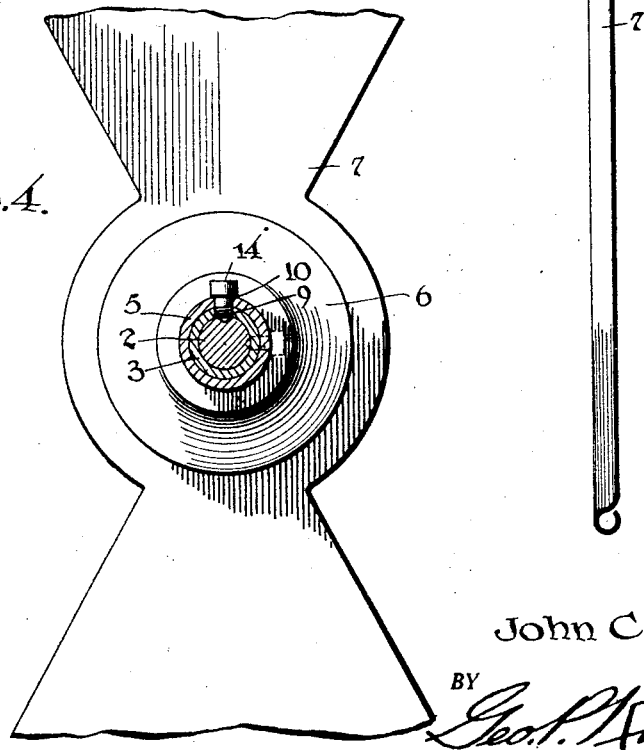
INVENTOR.
John C. Foster,
BY
ATTORNEY.

Patented Apr. 28, 1925.

1,535,820

UNITED STATES PATENT OFFICE.

JOHN C. FOSTER, OF MERKEL, TEXAS.

SHUTTER-TIMING MECHANISM FOR MOTION-PICTURE MACHINES.

Application filed January 24, 1924. Serial No. 688,229.

*To all whom it may concern:*

Be it known that I, JOHN C. FOSTER, a citizen of the United States, residing at Merkel, in the county of Taylor and State of Texas, have invented certain new and useful Improvements in Shutter-Timing Mechanism for Motion-Picture Machines, of which the following is a specification.

This invention relates to a shutter timing mechanism for use in connection with motion picture machines, and has for its object to provide, in a manner as hereinafter set forth, a mechanism of such class, capable of being expeditiously attached in position to the machine and when positioned bodily movable as an entirety with the shutter driving shaft, thereby overcoming any friction between the mechanism and the shaft, or in other words setting up the mechanism with respect to the shutter driving shaft to eliminate all friction therebetween, and further to provide the mechanism with means to provide for quickly setting the shutter in the desired timing position and for maintaining the shutter in the position to which it has been set during the operation of the shutter driving shaft.

Further objects of the invention are to provide, in a manner as hereinafter set forth, a shutter driving mechanism for use in connection with motion picture machines, and which is simple in its construction and arrangement, strong, durable, compact, readily adjusted, thoroughly efficient and convenient in its use, quickly installed with respect to the machine, and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is an elevation of a motion picture machine, showing the adaptation thereto of a shutter timing mechanism in accordance with this invention.

Figure 2 is a grouped perspective view of a shutter timing mechanism in accordance with this invention.

Figure 3 is a longitudinal sectional view showing the adaptation of the shutter timing mechanism, in connection with the shutter and shutter driving shaft.

Figure 4 is a section on line 4—4, Figure 3, and further illustrating the combined guide and securing element in full and dotted lines.

Referring to the drawings in detail, 1 denotes a motion picture machine which has projecting therefrom a shutter driving shaft 2, and connected to the latter so as to bodily revolve therewith, as an entirety, is the shutter timing mechanism in accordance with this invention.

The shutter timing mechanism comprises a cylindrical sleeve 3 of substantial length, which is mounted upon and connected to the shaft 2 so as to bodily revolve therewith, and said sleeve 3, at its inner end, is formed with a laterally extending annular flange 4.

The inner diameter of the sleeve 3 is such as to snugly engage the periphery of the shaft 2.

Mounted upon the sleeve 3 is a longitudinally shiftable shutter carrying member 5 in the form of a cylindrical sleeve of substantial length and with the length thereof materially less than the length of the sleeve 3. The inner diameter of the member 5 is such as to provide for the snug engagement of the member 5 with the periphery of the sleeve 3, but the fit is such as not to interfere with the longitudinal adjustment of the member 5 when occasion requires.

Fixedly secured to the outer end of the member 5 is a hub 6 of a shutter 7, and the latter as illustrated is shown as formed of a pair of blades, but it is to be understood that the shutter can be of any suitable form. The member 5, at its rear end, is provided with a laterally extending annular flange 8, and said member 5 intermediate its ends is formed with an arcuate slot 9 extended in a forward direction with respect to the flange 8. The slot 9 has its rear end spaced from the flange 8 and its forward end spaced from the forward end of the member 5.

The sleeve 3 and member 5 are bodily movable with the shaft 2, and to provide for such action the said sleeve 3 and member 5 are connected together and the sleeve 3 is secured to the shaft 2 by a combined guide and securing element which consists of a shank 10 extended through the slot 9 and having a threaded portion 11 for threadably engaging with the wall of an opening 12, formed in the sleeve 3. The shank 10 projects from the inner face of the sleeve 3 and engages in a pocket 13 formed in the periphery of the shaft 2. The outer end of the shank 10 has formed integral therewith a grooved head 14 of greater diameter than the shank 10 and which bears against the periphery of the member 5. By this arrangement the shaft 2, sleeve 3 and member 5 bodily revolve together carrying the shutter therewith and overcome any friction between the parts. When the sleeve 5 is shifted the combined guide and securing element travels in the slot 9 and provides, in connection with the wall of the slot 9, means for shifting the member 5 circumferentially with respect to the sleeve 3 to set the shutter 7 at the desired timing position.

Surrounding the sleeve 3, and bearing against the flanges 4 and 8, is a coiled controlling spring 15 for shifting the member 5, when released, lengthwise of the sleeve 3. The spring 15 is inclosed by a combined adjusting and locking device for the member 5, and said device consists of a pair of cup-shaped members 16 and 17, the former of greater diameter than the latter and having its inner face threaded, as at 18. The member 17 extends into the member 16 and is provided with peripheral threads 19 for engagement with threads 18 of the member 16, whereby the two members are connected together. The forward end of the member 16 is open and the rear end of the member 17 is open. The forward end of the member 17 is provided with a centrally disposed opening 20 for the passage of the member 5, and said member 17 is set up with respect to the member 5, so that the flange 8 of the latter abuts against the inner face at the forward end of the member 17. The rear end of the member 16 is formed with a centrally disposed opening 21 for the passage of the shaft 2, and said member 16 is arranged with respect to the sleeve 3, so that the rear end of the latter will abut against the inner face of the rear end of the member 16. The periphery of the member 16 is knurled, as at 22, to facilitate the shifting thereof manually when desired. The forward end of the member 17 is flanged, as at 23, and the periphery of the flange is knurled or serrated to facilitate the shifting of the member 17.

It will be assumed that the elements of the mechanism are in the position as shown in Figure 3 of the drawings, which is the arrangement prior to any adjustment, and it be desired to set the position of the shutter 7, the member 16 is revolved in an anticlockwise direction or the member 17 in a clockwise direction, which action will draw the two members 16 and 17 towards each other against the action of the spring 15 and as the members move towards each other, the forward end of the member 17 engaging the flange 8 will shift the member 5 rearwardly and lengthwise of the sleeve 3, and as the member 5 moves rearwardly, the shank 10 travelling in the slot 9, will shift the member 5 circumferentially of the sleeve 3, whereby the shutter 7 can be set in the desired position. The engagement of the threads 19 with the threads 18 will lock the member 5 in the position to which it has been adjusted.

It is thought that the many advantages of a shutter timing mechanism as herein described, can be readily understood and although the preferred embodiment of the invention is as described and illustrated, yet it is to be understood that changes in the details of construction can be had which will fall within the light of the invention as claimed.

What I claim is:—

1. A shutter timing mechanism for the purpose set forth comprising a shutter carrying member, means engaging one end of said member for shifting it lengthwise with respect to a revolvable shutter driving shaft, and a combined guide and securing element carried by said means for revolving said member to adjust the shutter when said member is shifted lengthwise, said element common to said means and member for securing said means and member to said shaft to provide for the bodily revolving of said member, means and element with said shaft.

2. A shutter timing mechanism for the purpose set forth comprising a shutter carrying member, means engaging one end of said member for shifting it lengthwise with respect to a revolvable shutter driving shaft, and a combined guide and securing element carried by said means for revolving said member to adjust the shutter when said member is shifted lengthwise, said element common to said means and member for securing said means and member to said shaft to provide for the bodily revolving of said member, means and element with said shaft, and said member having an arcuate slot for the reception of said element.

3. A shutter timing machine for the purpose set forth comprising a shutter carrying member provided with an arcuate slot, an extensible and contractile adjusting device engageable with one end of said member for shifting it lengthwise with respect to a revolving shutter driving shaft, and means carried by said device and coacting with said slot for revolving said member to adjust the shutter when said member is shifted lengthwise with respect to its driving shaft, said means common to said device and member for securing them to said driving shaft to provide for the bodily revolving of said member, device and means with said shaft.

4. A shutter timing mechanism for the purpose set forth comprising a slotted shutter carrying member, an extensible and contractile spring controlled adjusting device mounted on a driving shaft for said member and engageable with said member for shifting the latter lengthwise with respect to said driving shaft, and means carried by said device and coacting with the slot of said member for revolving it when shifted lengthwise to adjust the shutter and further for connecting said member and device to said shaft to provide for the bodily revolving of said member, device and means with said shaft.

5. A shutter timing mechanism for the purpose set forth comprising a sleeve adapted to be mounted upon a revolvable shutter driving shaft, a slotted shutter carrying member mounted on said sleeve, an adjusting device connected with and surrounding said member and further inclosing the inner portion of said sleeve said device projecting rearwardly from and providing means for shifting said member lengthwise with respect to said sleeve, and a combined guide and securing element fixed to said sleeve and coacting with the slot of the member for revolving the latter when the member is shifted lengthwise to adjust the position of the shutter and further for connecting said sleeve to said shaft to provide for the bodily revolving of the sleeve, adjusting device, member and element with said shaft.

6. A shutter timing mechanism for the purpose set forth comprising a sleeve adapted to be mounted upon a revolvable shutter driving shaft, a slotted shutter carrying member mounted on said sleeve, an adjusting device connected with and surrounding the inner end of said member and further surrounding a portion of said sleeve, said device projecting rearwardly from and providing means for shifting said member lengthwise with respect to said sleeve, and a combined guide and securing element fixed to said sleeve and coacting with the slot of the member for revolving the latter when the member is shifted lengthwise to adjust the position of the shutter and further for connecting said sleeve to said shaft to provide for the bodily revolving of the sleeve, adjusting device, member and element with said shaft, said device having inherent means for maintaining said member in the position to which it has been adjusted.

7. A shutter timing mechanism for the purpose set forth comprising a sleeve adapted to be mounted upon a revolvable shutter driving shaft, a slotted shutter carrying member mounted on said sleeve, an adjusting device connected with and surrounding said member and further surrounding a portion of said sleeve and projecting rearwardly therefrom and providing means for shifting said member lengthwise with respect to said sleeve, a combined guide and securing element fixed to said sleeve and coacting with the slot of the member for revolving the latter when the member is shifted lengthwise and further for connecting said sleeve to said shaft to provide for the bodily revolving of the sleeve, adjusting device, member and element with said shaft, said device having inherent means for maintaining said member in the position to which it has been adjusted, said sleeve and said member having the rear end thereof provided with a flange, and a coiled spring interposed between said flanges and surrounding the sleeve.

8. In a shutter timing mechanism for the purpose set forth the combination with a shutter driving shaft, of a shutter carrying element mounted on said shaft, an adjusting device mounted on the shaft and engaging with said element for shifting it lengthwise with respect to the shaft, and means carried by said device and engaging in said element for revolving the latter to adjust the position of the shutter when said element is shifted lengthwise, said means being common to said element and device for securing them to the shaft to provide for the bodily rotation thereof with said shaft.

In testimony whereof, I affix my signature hereto.

JOHN C. FOSTER.